F. ANDERSON.
MIXING MACHINE.
APPLICATION FILED MAR. 6, 1917.
1,255,376.
Patented Feb. 5, 1918.
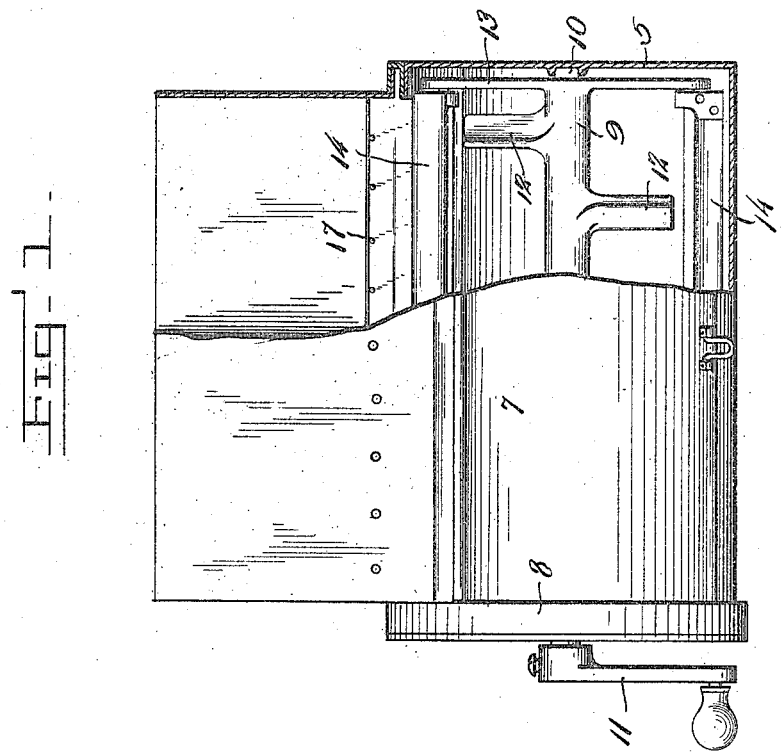
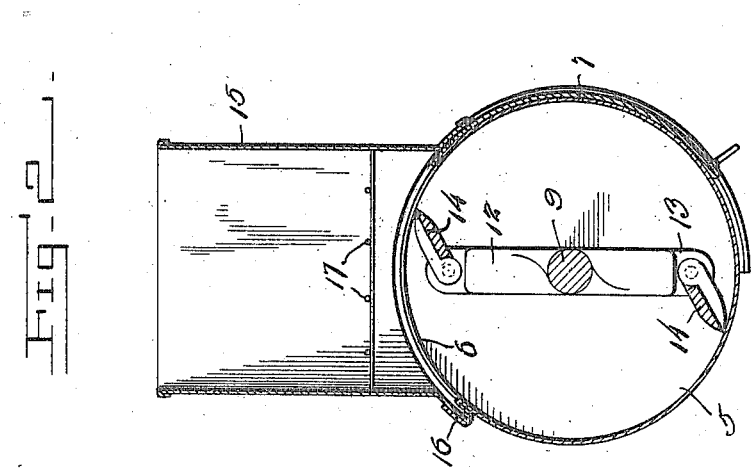
WITNESSES
INVENTOR
Fred Anderson
BY
ATTORNEY

UNITED STATES PATENT OFFICE.

FRED ANDERSON, OF CEDAR RAPIDS, IOWA.

MIXING-MACHINE.

1,255,376. Specification of Letters Patent. Patented Feb. 5, 1918.

Application filed March 6, 1917. Serial No. 152,821.

*To all whom it may concern:*

Be it known that I, FRED ANDERSON, a citizen of the United States, residing at Cedar Rapids, in the county of Linn and State of Iowa, have invented certain new and useful Improvements in Mixing-Machines, of which the following is a specification.

This invention relates to a mixing machine, and more particularly to a machine for mixing oleomargarin with a suitable coloring, or may be used to mix other food products.

The primary object of the present invention is to provide a machine of this type which will thoroughly and effectively agitate the oleomargarin and the coloring so that the same will be thoroughly mixed together.

Ordinarily, when the oleomargarin is manufactured it is placed in rectangular or other cartons, and when it is desired to mix this oleomargarin with the coloring it is necessary to melt the same.

It is an object of my invention to obviate this and to provide cutting means whereby the cartons may be removed from the cake or block of oleomargarin and the same may be forced through the cutting means thereby cutting the oleomargarin up into small pieces and allowing them to fall into the interior of the machine.

A further object of the invention is to provide a mixing machine which embodies a novel form of mixing blades.

A still further object of the invention is to provide a mixing machine of the above mentioned character which may be easily and effectively operated by any one with little physical effort.

An additional object is to provide a machine for mixing oleomargarin or other food products which consists of few parts, is inexpensive to manufacture and which may be placed on the market at a comparatively low cost.

The invention consists of the particular arrangement of parts, combinations and operation as will be hereinafter set forth in detail, explicitly defined in the appended claims and illustrated in the accompanying drawing, in which—

Figure 1 is a side view of a mixing machine constructed in accordance with my invention, parts of the machine being broken away, and Fig. 2 is a vertical transverse sectional view through Fig. 1.

Referring to the drawing in which like characters of reference indicate corresponding parts, the numeral 5 designates a casing which in this instance is cylindrical, but this casing may be of any configuration desired. This casing is provided with a relatively large opening at its top, this being indicated at 6, which is closed by a slidable door 7 which slides in guides 8 at the opposite ends of the casing.

Extending longitudinally through the casing 5 is a rotatable shaft 9 having one end thereof mounted in a bearing 10 at one end of the casing and its opposite end extending through the opposite end of the casing and has rigidly secured thereto a crank handle 11 whereby to rotate the shaft. Formed on the shaft 9 and extending in opposite directions are agitating or mixing blades 12. Secured to the ends of this shaft 9 and extending at right angles thereto are end bars 13 in which are pivotally mounted scraping or mixing blades 14 which contact with the inner face of the casing 5.

Mounted above the opening 6 in the casing 5 is a rectangular hopper 15 in which the oleomargarin is adapted to be inserted. As above stated the oleomargarin is packed in cartons and for this reason I employ a rectangular shaped hopper. This hopper is secured to the casing 5 in any desirable manner, one particular manner being designated by the numeral 16.

In order to provide for the removal of the contents from the casing one end thereof is made removable as indicated at 18. This removable end is in the form of a cap plate and is provided on its inner face with an annular flange 19 adapted to be received within the end of the cylinder. The crank 16 secured upon the end of the shaft is adapted to retain the removable end in position. If desired an ordinary washer may be interpositioned between the crank and the outer face of the removable end. It is evident therefore that by removing the crank handle from the shaft the movable end may be quickly attached and the contents thereby permitted to pass out through the open end of the casing.

Secured to the transverse and longitudinal walls of the hopper 15 is a plurality of wire strands or bars 17 which extend at right angles to each other and provide a network.

Thus it will be seen that upon removing the oleomargarin from the cartons the block or cake of oleomargarin is placed in the hopper 15 and forced against the wire strands or bars 17 which will cut the cake up into small pieces thereby allowing them to drop into the casing 5. The coloring is now inserted and the handle 11 rotated to actuate the mixing blades to thoroughly mix the oleomargarin and the coloring.

While I have specifically stated the mixing machine as used for mixing oleomargarin, it will be manifest that it may be used to mix almost any other composition or food products.

The above disclosure is what I now consider to be the preferred embodiment of my inventive idea, but I do not wish to be limited to the exact arrangement and details thereof, and I desire it to be known that the inventive idea may be carried out in many different ways than the one disclosed, that may fairly fall within the scope of the herewith appended claims.

What is claimed is:

1. A mixing machine, including a casing provided with an opening, a hopper surrounding said opening, a sliding door and adapted to close said opening, cutting members secured in said hopper in proximity to said opening, and agitating means arranged in said casing.

2. A mixing machine, including a casing provided with an opening, a hopper positioned on the casing and surrounding said opening, a plurality of cutting members secured in said hopper, guides secured to the opposite ends of the casing, a sliding door operating in said guides and adapted to close said opening, a rotatable shaft mounted in the casing, plates carried by said shaft, bars secured to the opposite ends of the shaft and rotatable therewith, and scrapers pivotally mounted between said bars and agitating blades carried by the shaft.

In testimony whereof I affix my signature in presence of two witnesses.

FRED ANDERSON.

Witnesses:
W. J. WALSH,
S. M. BROBERG.

Copies of this patent may be obtained for five cents each, by addressing the "Commissioner of Patents, Washington, D. C."